INVENTOR.
TADEUSZ BUDZICH

United States Patent Office 3,444,689
Patented May 20, 1969

3,444,689
DIFFERENTIAL PRESSURE COMPENSATOR CONTROL
Tadeusz Budzich, Moreland Hills, Ohio, assignor to The Weatherhead Company, Cleveland, Ohio, a corporation of Ohio
Filed Feb. 2, 1967, Ser. No. 613,533
Int. Cl. F15b *11/02, 13/16*
U.S. Cl. 60—52          27 Claims

ABSTRACT OF THE DISCLOSURE

A fluid pressure system in which an expansible chamber motor is operated by a variable displacement pump. The pump displacement is regulated by a control valve which operates in response to the motor chamber pressure to vary the pump displacement to maintain the pump outlet pressure higher than the motor pressure over a varying range of motor pressures. The same control valve also operates as a pressure compensated control valve to limit the maximum pressure of the pump.

---

This invention relates generally fluids power systems and more particularly to fluid power systems using expansible chamber motors and a variable displacement pump in which the output of the pump is regulated in response to the load demand.

In general, fluid power systems can be divided into open center and closed center types, each of which has its own particular advantages and disadvantages in a particular application. Usually closed center systems have been limited in their use to applications where there is a substantially constant demand on the pump and open center systems have been preferred where demand is intermittent or where full pump output is required for only a small amount of the time the system is in operation. In this latter type situation, closed center systems have not been efficient because of the high power loss required by the pump operating at full output pressure and the fact that the system is pressurized at a high level at all times makes leakage a particularly severe problem.

In order to overcome these and other problems in closed center systems, it has been recognized that a variable displacement pump can be used with a control so that the output volume and pressure of the pump is maintained at a relatively low level when there is no or only very low demand for the pump output, and the pump is then controlled so that its output may be increased when there is increased demand. To accomplish this purpose, it has been proposed to utilize a signal either from a control valve or from the load to operate the pump control to increase the pump output volume and pressure. However, such controls have been so complex or of such low reliability that they have received only limited use. Among the problems encountered with controls of this type are the coordination of a multiple number of loads, the provision of a maximum pump pressure limiting the control to prevent excessive pressure levels in the system, speed of response of the control to meet a rising demand of the load and a simplicity of construction allowing low cost of manufacture.

It is therefore an object of this invention to provide a novel and improved control for a variable displacement pump which is operable to regulate the pump output volume and pressure in response to the load demand.

It is another object of this invention to provide a novel and improved control as set forth in the preceding object which combines in a single unit a demand responsive control and a pressure limiting control to limit the maximum system pressure independently of the demand.

It is another object of this invention to provide a novel and improved control for a variable displacement pump as set forth in the preceding objects which maintains the pump outlet pressure at a substantially fixed pressure level differential above the load demand pressure independently of the absolute pressures of the load.

It is a further object of this invention to provide a novel and improved control for a variable displacement pump as set forth in the preceding objects which controls and limits the amount of throttling which takes place at the load control valve for regulating the speed of operation of the load.

It is still a further object of this invention to provide a novel and improved control for a variable displacement pump as set forth in the preceding objects which has a high speed of response, accuracy of control and simplicity of construction which lends itself to low cost manufacture without sacrifice of reliability and long life.

Briefly, the foregoing and other and additional objects and advantages of this invention are accomplished by providing a control valve for regulating the fluid flow from the output of the pump to a pump displacement control in which the pump is normally biased to a maximum displacement position. The operation of the control valve is determined by a control spring which opposes the outlet pressure operating on the valve member. Under no load conditions the control spring exerts a relatively light biasing force on the control valve so that a relatively low outlet pressure reduces the pump output displacement to the minimum level required to maintain the regulated pressure. A feedback is provided from the load to vary the biasing force of the control spring so that an increasing load pressure increases the biasing force of the spirng to increase the pump outlet pressure at which the displacement is reduced. The feedback line from the load may be either an open line having a restricted bleed therein combined with check valves or it may be a closed line having a sealed fluid chamber and piston acting on the control spring. The feedback line comes from the load downstream of the load control valve and may or may not be connected through the control valve to provide a pilot operation so that the pump outlet pressure may be increased before the load is actually connected to the pump outlet by the load control valve.

The foregoing as well as additional objects and features of the invention are accomplished in the preferred embodiments of the invention as shown in the accompanying drawings and described in the following detailed description.

Figure 4:
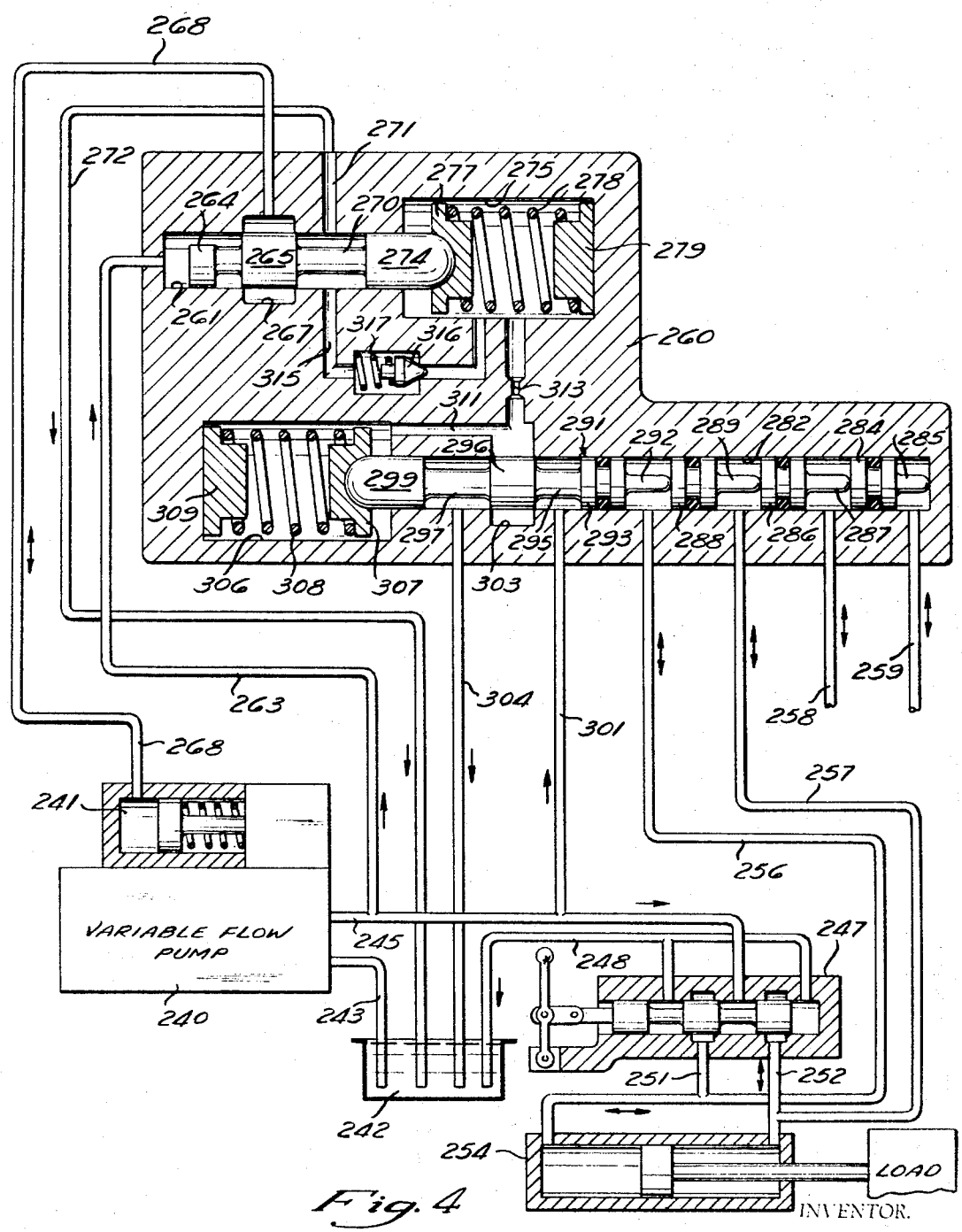
Figure 5:
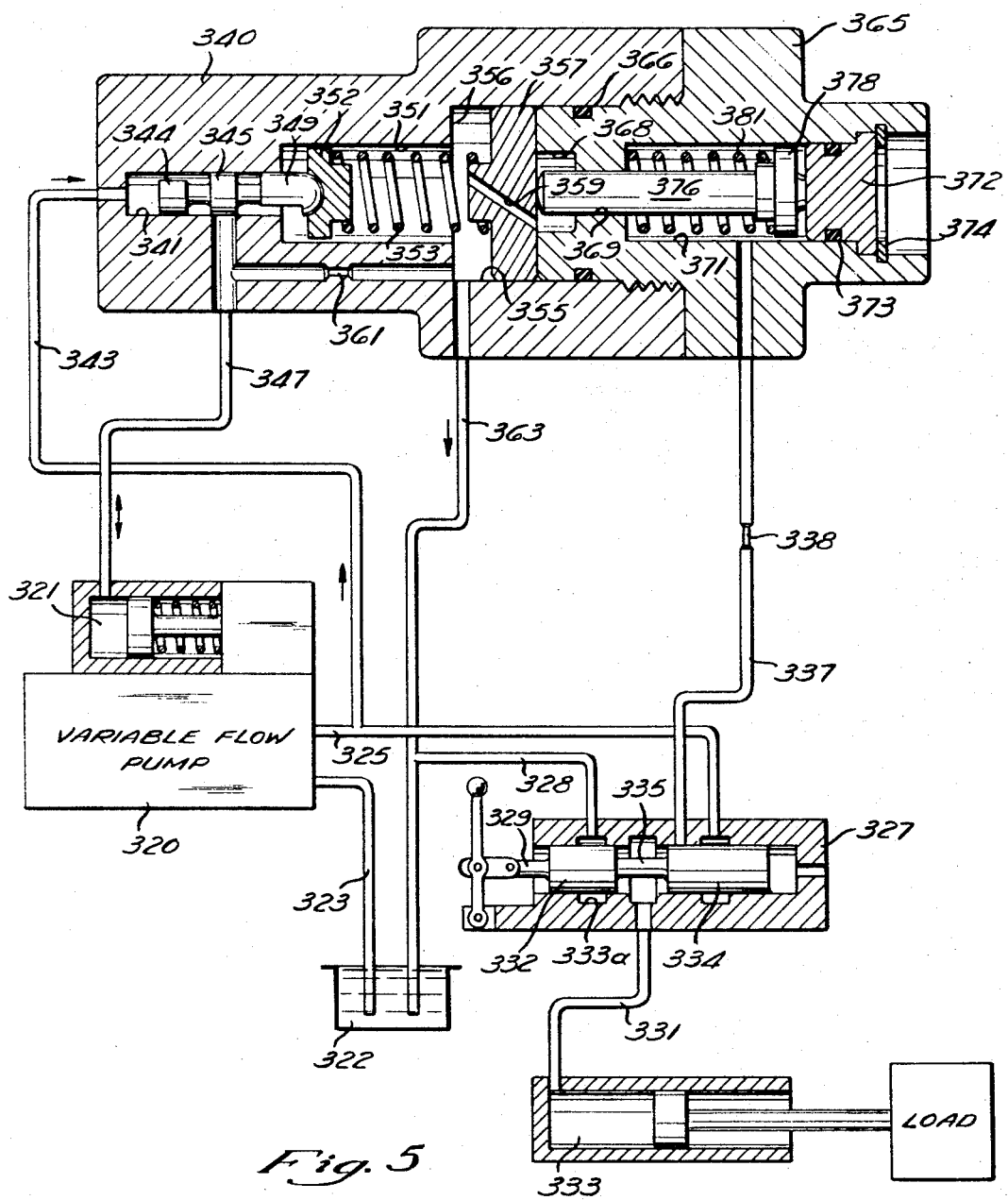

FIGURE 4 is a schematic circuit diagram of another embodiment of this invention utilizing closed feedback lines in which the valve operating as a pressure compensated control valve is of the feedback type; and FIGURE 5 is a schematic circuit diagram of another embodiment of this invention in which the load pressure is connected to the feedback line to the pump control valve only upon actuation of the load control valve.

Figure 1:
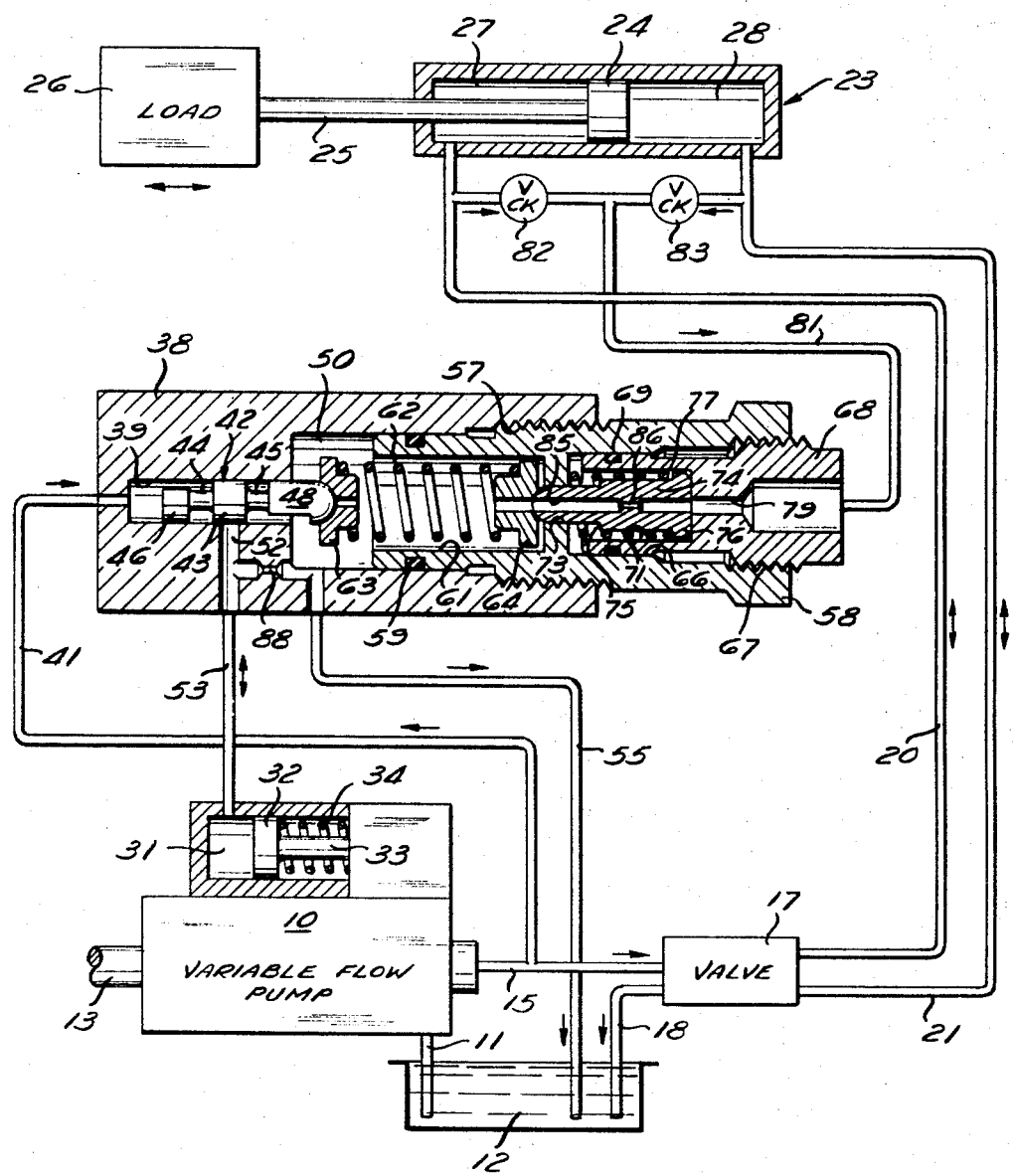
FIGURE 1 is a schematic circuit diagram of a preferred embodiment of this invention as applied to the reversible actuation of an expansible chamber fluid motor.

Referring now to the figures in greater detail, the circuit shown in FIGURE 1 includes a variable displacement pump 10 which may be of any type, such as an axial piston or radial piston pump in which there is a control member for varying the output displacement of the pump. As shown, the pump has an inlet line 11 which supplies fluid to the pump from a reservoir 12 and the pump is driven by suitable means from a prime mover such as by the drive shaft 13.

The pump has an outlet line 15 which is connected to a load control valve 17 which, as shown, may be of the four way type. A drain line 18 returns fluid from the valve 17 to the reservoir 12 and the valve 17 is connected through a pair of control lines 20 and 21 to opposite ends of a load cylinder 23. As shown, the cylinder 23 is a double acting expansible chamber fluid motor having a piston 24 therein which is connected by piston rod 25 to the load 26 to be driven by the motor. Thus, the piston 24 separates the interior of cylinder 23 into left and right fluid motor chambers 27 and 28 which are connected to the control lines 20 and 21, respectively.

The displacement of the pump 10 is varied by a control cylinder 31 which may be incorporated into the pump housing and within which is mounted a piston 32 connected by piston rod 33 to a pump member (not shown) which is used to vary the displacement of the pump. A spring 34 is shown as acting on piston 32 to bias piston 32 and rod 33 to the maximum displacement position. Thus, the introduction of fluid pressure into the cylinder 31 will force the piston 32 to the right against the biasing force of spring 34 to reduce the pump output displacement.

The control valve for controlling the admission of fluid pressure into the control cylinder 31 includes a housing 38 having a valve bore 39 therein at one end. The one end of bore 39 is connected through line 41 directly to the pump outlet line 15 so that this end of bore 39 is always exposed to full pump outlet pressure. A valve spool 42 is slidably mounted within bore 39 and has a central valving land 43 adjacent its midpoint and defined by left and right annular grooves 44 and 45, respectively. The left groove 44 is always exposed to full pump outlet pressure through the line 41 and communicated past flats on the left guide land 46 outward of the groove 44. Likewise, the right groove 45 is connected by flats on the right guide land 48 with the fluid pressure within an enlarged chamber 50 into which the right guide land 48 projects. When the spool 42 is in the neutral position as shown in FIGURE 1, the valving land 43 blocks a passage 52 which is connected through line 53 to the control cylinder 31. Thus, fluid pressure can act on the effective area of spool 42 shifting it to a right hand position with the left groove 44 in alignment with passage 52 to admit fluid at full outlet pressure into the passage 52 and line 53 to the control cylinder to reduce the pump output displacement. On the other hand the valve spool 42 can be shifted to the left against the pump outlet pressure so that the passage 52 is in communication with the right groove 45 to allow the fluid within the control cylinder 31 to flow back through passage 52 into groove 45 and hence past the guide land 48 into the chamber 50, which is connected by a line 55 to the reservoir 12 so that chamber 50 is always at reservoir pressure.

At its outer end the chamber 50 has an enlarged threaded counterbore 57 within which is mounted an end housing 58 making sealing engagement with the walls of chamber 50 by means of an O-ring seal 59. The end housing 58 has a bore 61 extending therein from the left end and freely communicating with the chamber 50. A control spring 62 is located within this bore 61 and at its left end engages a spring abutment 63 which also engages the end of the right guide land 48 of spool 42 so that the spring 62 is able to apply a biasing force to the spool 42 tending to move it to the left as shown in FIGURE 1. At its right hand end, the control spring 62 engages a right abutment plug 64, the axial movement of which within the bore 61 varies the biasing force applied by the control spring 62 on the valve spool 42.

At the right hand end of end housing 58 is a bore 66 having a threaded counterbore 67 at its outer end, within which is received a plug member 68 making sealing contact with the walls of bore 66 by means of O-ring seal 69. The plug 68 at its left end has a bore 71 in free communication with the right end housing bore 66. The end housing 58 has a reduced diameter bore 73 extending between the left and right bores 61 and 66 respectively. Bore 73 is slightly larger in diameter than valve bore 39 and slidably carries a plunger 74. The plunger at its one end engages the right control spring abutment plug 64 and at its right end extends into the plug bore 71 where it has an enlarged head 76. A balancing spring 77 is located around the plunger 74 and abuts at its left end against the inner end of end housing bore 66 and its right end against the plunger head 76 so it provides a biasing force tending to shift the plunger 74 to the right as shown in FIGURE 1. A shoulder 75 or plunger 74 limits its movement toward the left as it engages the end wall of bore 66 around bore 73. The plug member 68 has a passage 79 therein extending from the bore 71 and connected by a feedback line 81 to check valves 82 and 83 which communicate with the load control lines 20 and 21 respectively. These check valves 82 and 83 are connected so as to admit fluid pressure from the load control lines 20 and 21 into the feedback line 81, but to prevent flow in the reverse direction from the feedback line to the load control lines. Because these check valves close in response to the pressure in the feedback line, only one of these check valves will be open at a time so that the feedback line 81, will be pressurized at the higher pressure existing in either one of the motor chambers 27 and 28, and this pressure in the feedback line will close the check valve line communicating with the other chamber.

The plunger 74 has an axial passage 85 therethrough provided with a reduced diameter orifice 86 so that fluid in the feedback line 81 communicted into the bore 71 will be able to bleed at a slow but controlled rate into the chamber 50 for return to the reservoir to allow the pressure in the line 81 to drop when the pressure drops in one of the motor chambers 27 and 28 so that the feedback line can return to this pressure and not remain in a condition where both of the check valves 82 and 83 would be closed to prevent communication of feedback pressure from the motor. In addition, the housing 38 is provided with an orifice passage 88 interconnecting the passage 52 and the chamber 50 to provide a small but controlled continuous bleed to reservoir of the fluid pressure within the control cylinder 31 for purposes of stability.

When there is no demand on the pump, that is, no pressure in the feedback line 81, the pressure in the plug bore 71 containing the plunger 74 will be at reservoir pressure because of the bleed through the plunger passage 85 to the chamber 50. Therefore, the plunger 74 will assume the position shown in FIGURE 1 against the end of the bore 71 so that the right spring abutment plug 64 shifts to the position applying the least compression to the control spring 62. In this position the control spring 62 applies only a relatively light biasing force to the spool 42 so that as pressure begins to build up in the pump outlet line 15, this pressure is transmitted to the line 41 to the left hand end of the spool 42 and shifts it a sufficient distance toward the right as to bring the left groove 44 into communication with the passage 52 so that the pump outlet fluid is transmitted to the control cylinder 31 to reduce the pump to the minimum displacement. Because of the existence of the orifice passage 88, there will always be a slight make up flow into the passage 52 which allows the spool to stabilize without oscillation to maintain a steady position of the piston 32 in control cylinder 31.

Thus, under no load conditions, the maximum pressure in the pump outlet line 15 is limited to a low level of, for example, 200 p.s.i. However, when a load is encountered in either of the load cylinder chambers 27 and 28, the resulting pressure in these chambers is transmitted through the appropriate one of the check valves 82 and 83 into the feedback line 81 where it is transmitted into the bore 71. Thus, the bore 71 is pressurized to bias the plunger 74 toward the left as seen in FIGURE 1 with a force corresponding to the motor chamber pressure required by the load. This results in an increasing force being applied to the control spring 62 moving the right abutment plug 64 to the left to thereby increase the biasing force on the spool 42. This increased biasing force requires an increased balancing force transmitted to the line 41, and accordingly the control cylinder piston is shifted to increase the pump output displacement by the amount necessary to return the valve spool 42 to an equilibrium position. Thus, the greater the feedback pressure in line 81, the greater the pressure level in line 41 and hence at the pump outlet to maintain an equilibrium condition in the control cylinder 31.

The balancing spring 77 biasing the plunger 74 toward the right performs a compensating function to maintain the pump outlet pressure in line 15 a fixed difference above the pressure in feedback line 81 regardless of the magnitude of the pump outlet pressure. This allows the load control valve 17 to be operated as a flow control valve to permit precise control of the load 26.

It will be seen that the entire assembly consisting of the valve spool 42, control spring 62 and plunger 74 may be considered as a unit, since they may slide in the control valve housing in such fashion. Since the pressure in line 41 corresponds to the high pressure side of the load control valve 17 and outlet line 15 and the pressure acting on plunger 74 through the feedback line 81 corresponds to the low pressure across the load valve 17 there is a pressure unbalance across this unit exactly corresponding to the pressure drop across the load control valve 17. However, since plunger 74 has a larger diameter than valve spool 42, the forces are in balance if the ratio between the pressure in lines 41 and 81 is the same as the ratio between the areas of bores 73 and 39.

For this reason, a given pressure differential will correspond with a given differential area only at a given absolute pressure level, so that in the absence of any other forces an increase in the pump outlet pressure will result in an increasing pressure differential between lines 41 and 81 as determined by the ratio of the areas between the bores 73 and 39. To compensate for this, the balancing spring 77 provides a compensating force acting on the plunger 74. Since movement of the plunger 74 toward the left is controlled by the spring 62, and since increased movement of the plunger 74 toward the left corresponds with an increase in the pressure in feedback line 81 which corresponds to an increase in pump outlet pressure, the plunger 74 will tend to move toward the left in a linear fashion with increasing pump outlet pressure. The balancing spring 77 acts between the end housing 58 and the plunger 74 so as to provide an increasing biasing force on the plunger 74 opposing movement toward the left. The balancing spring 77 may therefore be chosen to have a spring rate corresponding to the area differential between the bores 39 and 73 so that it provides an increasing biasing force with increasing movement of the plunger 74 toward the left with increasing pressure. The effect of the area differential between the bores is decreased so that the ratio between the pressures in lines 41 and 81 decreases in such a manner that the pressure difference is constant. Thus, the compensation provides a fixed pressure differential between lines 41 and 81 and across the control valve 17 which is independent of pump outlet pressure below the maximum outlet pressure for which the pump is regulated. Because of this ability to maintain a constant pressure differential across the control valve, precise throttling for regulation of the speed of operation may take place independently of the magnitude of the load.

The valve assembly within the housing 38 also functions as a pressure compensated control valve for the pump. As the pressure in the feedback line 81 increases toward a predetermined maximum, the plunger 74 is moved to the left until the shoulder 75 abuts against the end wall of bore 66 surrounding the bore 73 so that further movement of the plunger 74 to the left is prevented. Since increasing feedback pressure in line 81 can no longer increase the biasing force of the spring 62, any increase in the pump outlet pressure in line 41 after engagement of the shoulder 75 has prevented further movement of plunger 74 will result in continued movement of the valve spool 42 to the right to decrease the pump output volume to prevent further increases in outlet pressure above this predetermined limit. Thus, the valve operates to regulate the pump outlet pressure and volume in accordance with the demand only until the load reaches a predetermined maximum, after which no further increase in pump outlet pressure above the maximum is possible.

Assuming that the pump has been regulated to a given high pressure determined by the load, a decrease in the load will result in a decrease in the pressure in the controlling one of the chambers 27 and 28, so that the corresponding one of the check valve 82 and 83 will close to isolate the feedback line 81 from the load. Since there is a bleed through the plunger passage 85 and orifice 86 into the chamber 50 which is connected to drain, the fluid within the bore 71 will bleed out through the passage allowing the plunger 74 to move to the right to decrease the bias on control spring 62. This allows the pressure in line 41 to shift the valve spool 42 to the right to allow high pressure to enter the control cylinder 31 through line 53 and moves the piston 32 to the right to decrease the pump output volume and thereby cause a drop in the pump outlet line until the pressure balance between the pump outlet and the load is such that the corresponding one of the check valves 82 and 83 will open to allow a return to equilibrium conditions.

Figure 2:
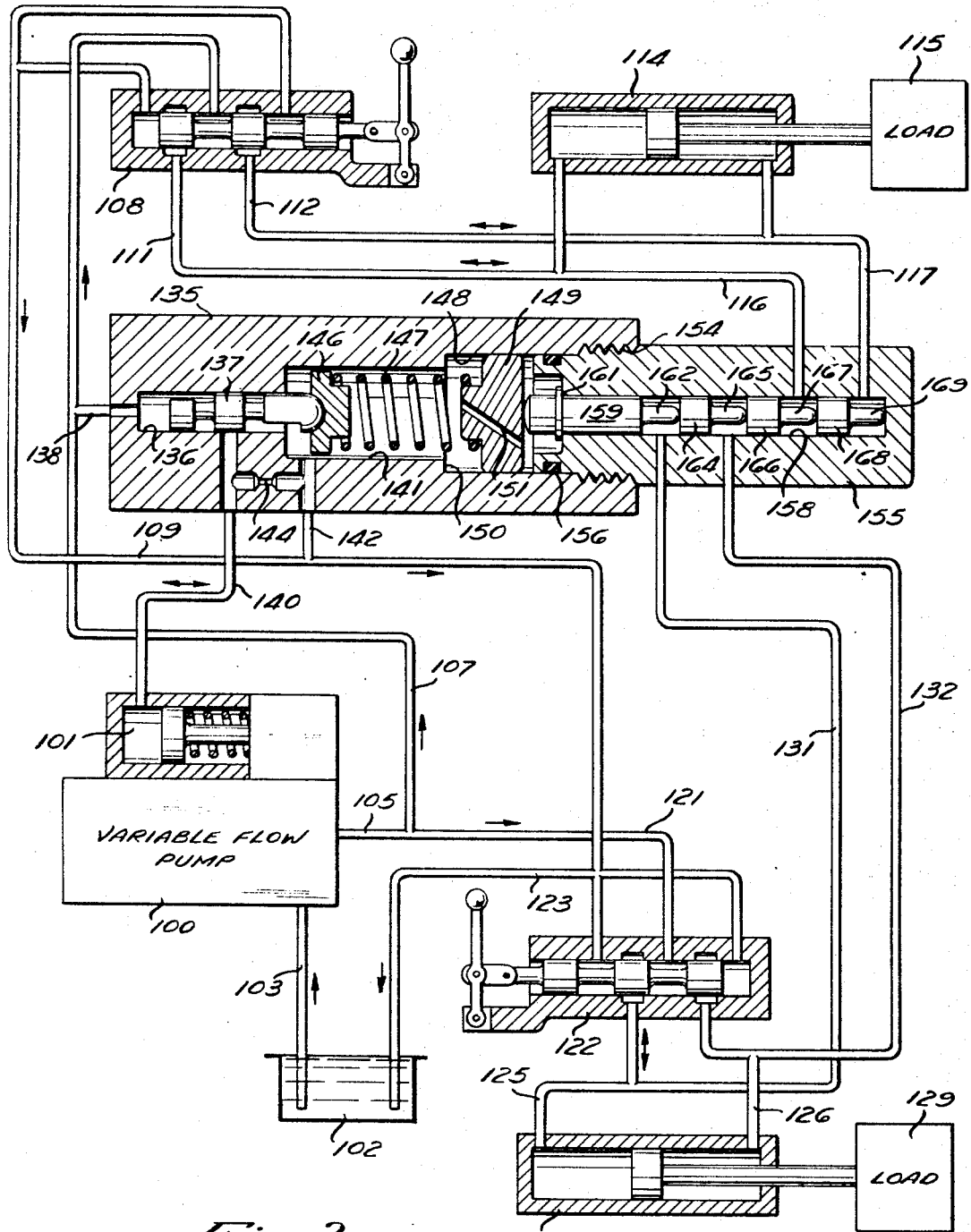
FIGURE 2 is a schematic circuit diagram of another embodiment of this invention utilizing closed circuit feedback lines from the load to the pump control valve.

FIGURE 2 shows a modified control arrangement in which the feedback lines from the load motor chambers are isolated from each other and from the reservoir without requiring the use of any check valves. The system includes a pump 100 having a control cylinder 101 and supplied with fluid from reservoir 102 through line 103 and having a discharge line 105. All of this structure, it will be understood, may be exactly the same as the corresponding structure in FIGURE 1.

The outlet line 105 is connected through line 107 to a load control valve 108 which is of the four way type and connected to the reservoir 102 through a drain line 109. The valve 108 has a pair of outlet lines 111 and 112 connected to a double acting expansible chamber motor cylinder 114 for actuating a load indicated at 115. Also connected to lines 111 and 112 are a pair of feedback lines 116 and 117, respectively.

In similar manner, another line 21 connects the outlet line 105 to a second load control valve 122 which is also of the four way type and is provided with a drain line 123. In turn, control valve 122 is connected by a pair of lines 125 and 126 to a double acting expansible chamber cylinder 128 for actuating another load indicated at 129. Feedback lines 131 and 132 are connected to the lines 125 and 126, respectively to provide a feedback at all times of the pressure in the two chambers of motor 128.

The control valve for controlling the fluid flow to and from the pump control cylinder 101 is mounted in a housing 135 having an axial bore 136 at one end therein. A valve spool 137 is slidably mounted in the bore 136 and is identical in construction with valve spool 42 shown in FIGURE 1. A high pressure line 138 conducts fluid from the pump outlet line 107 into the end of bore 136 to provide the biasing force on valve spool 137 toward the right, and a line 140 connects the bore 136 with the control cylinder 101. The housing 135 has a chamber 141 into which the valve spool 137 projects, and the chamber 141 is connected to drain through a line 142. A metering orifice 144 interconnects the control line 140 with drain line 142 to provide a metered bleed for the control cylinder 101.

The valve spool 137 projects into the chamber 141 where it engages a spring abutment member 146 which engages one end of a control spring 147 mounted in chamber 141. At its outer end, control spring 147 engages a piston 149 slidably mounted in a counterbore 148 so that movement of the piston 149 to the left is limited by its engagement with a shoulder 150 formed at the junction of counterbore 148 and chamber 141. The piston 149 has a passage 151 therethrough to insure that the space on both sides of the piston is always connected to drain so as to prevent the build up of any fluid pressure forces acting on the piston 149.

At its outer end, the counterbore 148 is provided with an internally threaded portion 154 to receive a plunger housing 155 which makes sealing engagement with the counterbore 148 by means of a suitable O-ring seal 156. The housing 155 has an axial bore slightly larger in diameter than valve bore 136 extending axially therein from the counterbore 148, and a plunger 159 is slidably mounted in the open end of the bore 158. The plunger 159 engages the pistion 149 to force it to the left as shown in FIGURE 2 while a shoulder 161 on the plunger engages the end of housing 155 to limit movement of the piston 149 and plunger 159 to the right and thereby determine the load pressure level setting for the pump when there is no demand.

The feedback lines 131, 132, 116 and 117 open into the bore 158 at axially spaced points, and accordingly, the plunger 159 has a reduced diameter spacing projection 162 thereon in alignment with the opening of line 131. Likewise, at spaced distances within the bore 158 inward of the plunger 159 are pistons 164, 166 and 168 likewise having spacing projections 165, 167 and 169 respectively, in alignment with the other feedback lines 132, 116 and 117, respectively. With this arrangement, each of the feedback lines opens into the bore 158 and the fluid pressure therein is applied to one of the piston 164, 166 and 168 or the plunger 159 and by contact through the spacing projections will apply a force to the plunger 159 biasing the piston 149 to the left to increase the effective force of the control spring 147 on the valve spool 137. Thus, the pressure forces in the feedback lines which correspond to the pressure in the load cylinders operate to shift the valve spool 137 so as to drain fluid from the control cylinder 101 to increase the pump output displacement in response to the load demand. It should be noted that only one of the pistons or the plunger will be operated by the feedback line, and that will be done by the feedback line having the highest pressure. In such case, since the area of the pistons and plunger are the same, any feedback line having a lower pressure will be ineffective to overcome the force of the highest feedback pressure and this highest feedback pressure will therefore move the plunger 159 and any intermediate ones of the pistons 164, 166 and 168 together as a unit by contact through the spacing projections, and therefore the movement of the control spring piston 149 will be responsive solely to the highest pressure in all of the feedback lines.

It should be noted that with this arrangement the feedback lines represent a closed circuit since there is no bleed from the lines and therefore no check valves are required. This means that all of the feedback lines at all times apply a feedback pressure to the plunger and piston arrangement within housing 155 and, upon a drop in fluid pressure in one of these chambers acting to shift the plunger 159 to the right because of a decrease of pressure in its associated load motor chamber, will cause a reversal of fluid flow to that feedback line so that the fluid then within the bore 158 flows back into the associated load cylinder.

It will be understood that the control spring 147 and valve spool 137 operate in the same manner as set forth in detail in connection with FIGURE 1 with an increase in the biasing force of control spring 147 as the piston 149 moves to the left to increase the pump output pressure until the pistion 149 contacts the shoulder 150. Since at that point an increase in the pump output pressure is not possible because the biasing force of control spring 147 can no longer increase, the valve spool 137 then operates as a pressure compensating valve to limit any further increase in the pump outlet pressure.

In the arrangement of FIGURE 2, because of the difference in areas between the valve bore 136 and plunger bore 158, for the reason set forth in the description of FIGURE 1, the pressure differential between the lines 138 and the highest pressure feedback line and hence across the load control valve 122 will increase with increasing pump outlet pressure. Accordingly a balance spring (not shown) similar to balance spring 77 in FIGURE 1 may be added to act between the valve body and the plunger 159 to compensate for this effect and give a constant pressure drop across the load control valve 122 regardless of pump outlet pressure.

In the previously described controls, the valve controlling the fluid flow to and from the pump control cylinder has been of the sequence type in which the chamber containing the control spring is always connected to drain and the control spring applies the sole biasing force on the valve spool opposing the pump outlet pressure. In the case of the system of FIGURE 1, the rates of the control cylinder spring 34 and the control spring 62 are such that at high pressure cut off the pump will begin to have its volume reduced below maximum at a pressure level that may be several hundred pounds below the final cut off pressure in which the output volume is finally reduced to zero. With this arrangement, a system having a nominal high pressure cut off of 3000 p.s.i. may begin to reduce below maximum volume at a level of 2800 p.s.i. and reach zero output volume at a pressure level in the outlet of 3200 p.s.i. This is true partly because the control cylinder pistion spring 34, because of its spring rate, exerts a greater force and therefore requires a greater pressure in the control cylinder at zero output volume than it does at maximum output volume. Also, because for stability purposes there is a continual bleed from this control chamber, it is necessary that to maintain the proper volume of flow to the control cylinder, the valve spool must shift a greater distance against the biasing force of its control spring to increase the rate of flow to the control cylinder because of the throttling that takes place at the valve spool and passage leading to the control cylinder to result in the pressure reduction between that at the pump outlet and that within the control cylinder. At the same time, the delay necessary to change preload of the control spring will to some extent affect the response of the control, especially with large variations of pressure corresponding to large variation in the load.

Cutoff is made much sharper by means of another arrangement for the pressure compensated control which is of the external feedback type in which the chamber containing the control spring is maintained at load pressure level. With this arrangement, positive actuation of the valve spool may be obtained with a much lighter control spring, since at high pressure a substantial portion of the biasing force on the valve spool will come from the control pressure in the chamber containing the control spring so that the effective rate of the control spring is decreased allowing a faster cut off between maximum and minimum output displacements corresponding to a smaller change in the pump outlet pressure differential than in the case with the sequence type control. At the same time, response of such control is greatly improved since change in the feedback pressure in the chamber containing the control spring may be accomplished much faster than change in the preload of the control spring. A load responsive control incorporating a feedback type of control for pressure compensated operation while retaining the load demand feature is obtained in the embodiment shown in FIGURE 3. In this system, there is provided a pump 180 of the variable displacement type having a control cylinder 181 and which may be the same in construction as the pump and control cylinder of the embodiments of FIGURES 1 and 2. The pump 180 draws fluid from a reservoir 182 through an intake line 183 and has a high pressure outlet line 185 to supply fluid to the rest of the system.

The outlet line 185 leads to a suitable load control valve 187 having a drain line 188 for returning fluid to the reservoir 182. The outlet of control 187 passes through line 190 to a load cylinder 192 which, for purposes of simplification, has been shown as being of the single acting type having a feedback line 194 to supply a signal to the load responsive control valve. The feedback line 194 has an orifice 195 therein to control the rate of fluid flow and stabilize the operation of the system. Although the load cylinder 192 has been shown as being of the single acting type, it will be understood that a double acting cylinder can be used with accompanying check valves to supply fluid to a single feedback line in the same manner as shown in the embodiment of FIGURE 1.

The pump control valve includes a housing 198 having a valve bore 199 therein at one end. A line 201 directs fluid at outlet line pressure from the line 185 into the left end of the valve bore 199 where it serves to bias a valve spool 202 toward the right and, depending upon the opposing force, admits outlet pressure through the control line 203 into the pump control cylinder 181. When the valve spool 202 is shifted in the opposite direction, it connects the control line 203 with the drain line 205 to return the fluid within the control cylinder 181 to the reservoir to allow the pump output volume to increase. The valve spool 202 has an end land 207 which projects into an enlarged chamber 208 within the housing 198 where it engages a spring abutment member 209. The valve spool land 207 makes sealing contact with the valve bore 199 so as to prevent the fluid pressure within the chamber 208 from leaking to reservoir through drain line 205. At the end away from the valve bore 199 the chamber 208 opens into an enlarged bore 211 at shoulder 212 and a piston 213 is slidably journalled within the large bore 211. A passage 214 extending through the piston 213 insures a pressure balance at all times on both sides of the piston. A control spring 216 is mounted within the chamber 208 and large bore 211 to abut at the one end against the spring abutment 209 in engagement with valve spool 202 and at the other end against the piston 213.

An end housing 218 has a threaded portion making engagement with the threaded outer end of the large bore 213 within which it fits and makes a seal by means of O-ring seal 219. The inner end of end housing 218 within the bore 211 has an axially extending recess 221 adjacent the piston 213 which communicates with a reduced diameter axial bore 223. At its other end bore 223 opens into a larger bore 224 which at its outer end opens into an enlarged counterbore 226 which is sealed at its outer end by a plug 229 and connected at its inner end to the feedback line 194.

A plunger 228 generally having a diameter equal to that of reduced bore 223 is slidably mounted therein. The plunger 228 extends into the large bore 224 where it has a first enlarged portion 231 making sealing contact with the walls of the bore 224. At its end plunger 228 has an enlarged end portion 235 the same diameter as bore 224 slidably mounted in bore 235a of plug 229 and spaced axially from the first enlarged portion 235 by an annular groove 227. To provide fluid communication from the feedback line to the control spring chamber 208, the plunger has a longitudinal passage 232 extending from end to end therethrough and a cross passage 233 opening into annular groove 227 to conduct fluid from the feedback line 194 and counterbore 226 into the large bore 211 and chamber 208 as well as into bore 235 in plug 229. The portion of the large bore 224 between the reduced bore 223 and the first enlarged plunger portion 231 is always connected to drain through a drain passage 234 and a passage having a small diameter orifice 236 therein communicates between the inner end of the end housing 218 adjacent piston 213 to the drain passage 234 to allow a small bleed of fluid from the space around piston 213 back to the reservoir once the piston 213 is moved away from end housing 218.

Figure 3:
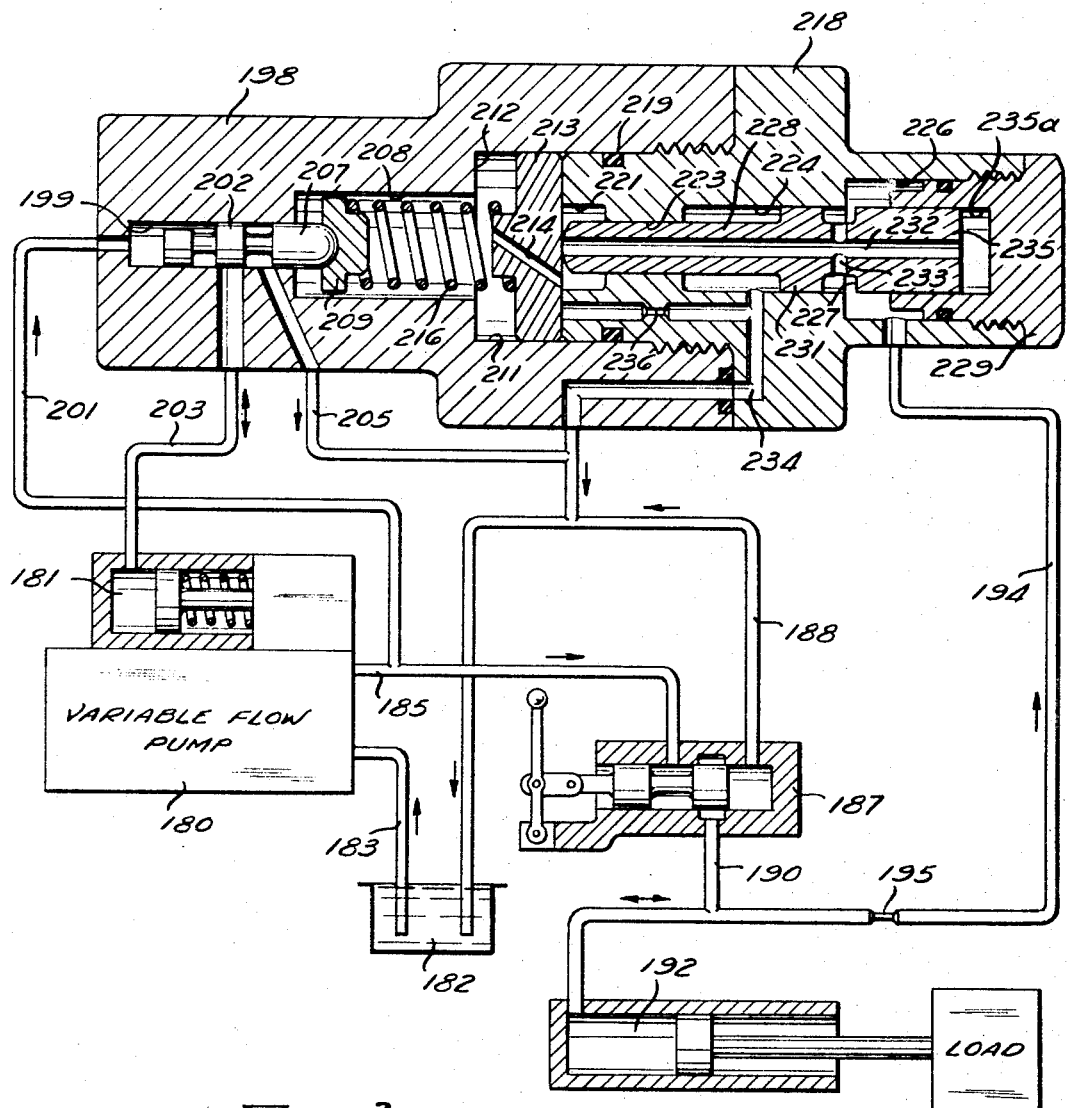
FIGURE 3 is a schematic circuit diagram of another embodiment of this invention in which the control valve acts as a feedback type pressure compensated control.

In many respects the system of FIGURE 3 operates in the same manner as the system of FIGURE 1. However, the controls spring chamber 208 below the cutoff pressure level is at all times subjected to the pressures existing in the feedback line 194 and this pressure always exerts a biasing force on the valve spool 202 opposing the pump outlet pressure acting on the other end of the valve spool. Although the plunger 228 is always biased against the control spring piston 213 by the pressure acting on the area of the bore 235a, it is always opposed by equal pressure acting on the area of the plunger 228 within the smaller bore 223. Because the space between the reduced bore 223 and the enlarged plunger portion 231 is always at drain pressure, the net force of the pressure biasing the plunger 228 against the control spring piston 213 is equal to the pressure times the area differential between the bores 223 and 224. This fluid pressure therefore tends to cause the plunger 228 to move to the left with a force proportional to the feedback pressure but because of the preload in the control spring, 216, the piston 213 will not move. Thus, within increasing load pressure in the feedback line 194, the biasing forces opposing the pump outlet presure acting on valve spool 202 are equal to the sum of the feedback pressure acting on the effective area of the valve spool 202 plus the pressure acting on the control spring piston 213 to increase the biasing force of the control spring 216. Thus, increasing load pressures require an increasing pump outlet pressure to maintain the valve spool 202 in a stable position, and this will therefore cause the pump outlet pressure to be increased by increasing the output displacement of the pump.

When the load pressure in the feedback line 194 reaches the maximum pressure level for which the pump is set, the force acting on the plunger 228, which is the line pressure acting on the area differential between the bores 223 and 224, will overcome the preload of the control spring 216 and tend to move the control spring piston 213 toward the left. This initial movement of the control spring piston 213 will uncover the bleed orifice passage 236 to allow a small flow of fluid to the reservoir from the feedback line 194 and through the passage 232 of plunger 228. A further increase in the feedback pressure will produce additional movement of the plunger 228 toward the left so that the groove 227 between lands 231 and 235 will move into the bore 224 to a point where fluid communication between the bore 226 and the cross passage 233 is restricted because of the throttling action which takes place at this point. When the load pressure is at the maximum cut off level, the plunger 228 will then have moved to a position where the flow from the feedback line 194 into the annular groove 227 will be equal to the flow to the reservoir through orifice passage 236 so that the pressure in the chamber 208 will be regulated at this maximum level and will therefore operate to shift the valve spool 202 to prevent any further increase in pump outlet pressure. Any further increase in the pressure in the feedback line 194 will merely cause slight additional movement of the plunger 228 to the left to decrease the effective orifice area controlling flow into the passage 232 to maintain that flow under such increasing pressure equal to the flow to reservoir through the orifice passage 236. Thus, whenever the pressure in the feedback line 194 exceeds the predetermined level for which the pump is set, the plunger 228 will serve as a pressure limiting valve to prevent any corresponding pressure build up in the chamber 208 and acting on the valve spool 202 which would tend to increase pump outlet pressure above the maxamum pressure level through its control of the pump outlet displacement.

From this it will be seen that the same structure of the valve which provides the demand responsive pump control also serves as a pressure compensated pump control to prevent the pump outlet pressure from rising above the predetermined maximum. As previously stated, this maximum pressure level is determined by the preload in the control spring 216 and the area differential between the bores 223 and 234 since it is the balance of these two forces which cause the initial movement of the plunger 228 to the left. The maximum limit of the pump is further determined by the position of the annular groove 227 and the rate of the control spring 216, so that by giving the control spring 216 a low rate and positioning the groove 227 so that little movement of the plunger 228 is required so a to result in the equilibrium of flow between the feedback line and the passage 232 and to the reservoir through the orifice passage 236, a very sharp cut off may be provided.

Another arrangement for providing a combination feedback type pressure compensated control with a demand compensated control is shown in FIGURE 4. The system includes a pump 240 of the variable displacement type having the displacement controlled by a control cylinder 241 in the same manner as in the previously described embodiments. A reservoir 242 supplies fluid to the pump through an intake line 243 and fluid is dischraged from the pump valve through the high pressure outlet line 245. A load control valve 247 shown as being of the four way type is connected to the outlet line 245 and connected back to drain through a drain line 248. In turn, the load control valve 247 is connected through outlet lines 251 and 252 to a double acting load cylinder 254. The outlet lines 251 and 252 in turn have feedback lines 256 and 257 connected to them and leading to the control valve housing. Also shown are additional feedback lines 258 and 259 which come from another load and control valve (not shown) which is connected to the pump outlet line 245 in the same manner as the load control valve 247.

The pump control valve is mounted in a housing 260 which has a valve bore 261 therein, the left end of which is connected through line 263 to the pump outlet line 245. A valve spool 264 is slidably mounted in the valve bore 261 and has a valving land 265 thereon which cooperates with an annular port 267 for controlling the fluid flow to and from the control cylinder 241 through a line 268. To the right of valving land 265 valve spool 264 has an annular groove 270 in alignment with a drain port 271 which connects back to the reservoir 242 through a drain line 272. The valve spool 264 has an end land 274 sealing off the valve bore 261 from chamber 275 into which it projects. A spring abutment member 277 engages the end land 274 and serves to position one end of the control spring 278 whose other end engages another spring abutment member 279 engaging the opposite end wall of chamber 275. Thus, since the spring abutment member 279 is fixed in position, the control spring 278 applies a substantially constant biasing force to the valve spool 264, the force varying only with the axial position of the valve spool.

The control valve housing 260 also has therein an elongated plunger bore 282 in which are slidably mounted a plurality of floating pistons 284, 286, and 288 which have spacing projections 285, 287 and 289 respectively, extending from their right ends. To the left of the left piston 288 is a plunger 291 also having a spacing projection 292 extending from the sealing portion 293 thereof. The feedback lines 258 and 259 open into the bore 282 adjacent the projections 287 and 285 respectively while the feedback lines 256 and 257 open into the plunger bore 282 in alignment with projections 292 and 289 respectively.

The plunger 291 has a pair of annular grooves 295 and 297 thereon to the left of the sealing portion 293, and these grooves define between them a valving land 296. The left groove 297 terminates in an end land 299 effectively sealing the end of the plunger bore 282. A high pressure supply line 301 conducts fluid from the pump outlet line 245 to the plunger bore 282 into which it opens at a point in alignment with the right plunger groove 295. An annular porting proove 303 is in alignment with the valving land 296 and has a width about the same as that of land 296, while the left groove 297 is connected back to reservoir through a drain line 304.

The plunger end land 299 extends beyond the plunger bore 282 into an enlarged chamber 306 where it engages a moveable spring abutment member 307. A control spring 308 is mounted within the chamber 306 to engage the spring abutment member 307 at one end to apply a biasing force to the plunger 291 and to engage a fixed abutment member 309 at the other end of chamber 306. A passage 311 connects the chamber 306 to the annular port 303 which is also connected through an orificed passage 313 to the other chamber 275 containing control spring 278. The chamber 275 is also connected through a passage 315 containing a relief valve 316 biased by spring 317 to prevent flow out of the chamber 275 and connects to the drain port 271 so as to allow fluid in the chamber 275 to pass to drain when the pressure is high enough to open the relief valve 316 at a pressure level determined by the biasing force of spring 317. It will be understood that springs 278, 308 and 317 may be provided with adjustments to vary the biasing forces they exert in the manner well known in the art.

The load pressures in the various load cylinder chambers will be supplied to the plunger bore 282 through the feedback lines 256, 257, 258 and 259 and the plunger 291 will therefore be moved toward the left against the biasing force of control spring 308 with a force corresponding only to the highest one of the pressures in the feedback lines and the fluid in these feedback lines will not pass to drain but merely flow to and from the load cylinders in the same manner as in the embodiment of FIGURE 2. When there is no substantial pressure in the feedback lines, the control spring 308 will shift the plunger 291 to the right so that the groove 297 allows communication between the annular port 303 and drain line 304 so that both the chamber 306 and the chamber 275 are at drain pressure. In this case, the actuation of the valve spool 264 is controlled only by the biasing force of the control spring 278 and this spring will therefore control the pump output pressure in accordance with its biasing force to maintain the pump at a relatively low level of say 200 to 300 p.s.i.

It will be understood that the control spring 308 in chamber 306 exerts a lower biasing force on the plunger 291 and that exerted on the valve spool 264 by the control spring 278 located in chamber 275. Thus, an initial increase of the pressure in one of the feedback lines will shift the plunger 291 a slight distance toward the left until the right groove 295 allows communication between the high pressure line 301 and the annular port 303 to allow a pressure increase in both the chamber 306 and the chamber 275. The pressure in these chambers will build up until the pressure in chamber 306 plus the force of the control spring 308 balances the plunger 291 to cause it to move into an equilibrium position maintaining a stable pressure, and in such case the same pressure will be maintained by the connection through the orifice passage 313 in the chamber 275. The purpose of the orifice in passage 313 is to control the rate of fluid flow into the chamber 275 to prevent pressure surges which may cause hunting or oscillation of the system. When this pressure is admitted into the chamber 275, it increases the biasing force of the valve spool 264, thereby requiring an increase in the pump outlet pressure to maintain the valve spool 264 in equilibrium. Thus, the operation of the plunger 291 acts as a pressure reducing valve controlling the fluid pressure within the chamber 275 to a lesser pressure still proportional to the pressure in the feedback lines acting on the plunger 291, and this increased pressure in the chamber 275 requires an increased pump output so that the pump outlet will always remain at a pressure level higher than that in the feedback line having the highest pressure. A particular feature of this arrangement is that the plunger 291 moves only a very short distance so that actual flow through the feedback lines is quite small, thus minimizing the energy lost in the feedback and allowing the use of very small diameter lines.

In order to allow this arrangement to function as a pressure compensated valve, the relief valve 316 opens when the maximum pump pressure is obtained and serves to limit the pressure build up in the chamber 275 to that level of the pump output corresponding to the maximum pressure. Since the relief valve 316 can drain fluid out of chamber 275 faster than it can flow in through the orificed passage 313, regardless of the increase in the pressure within the annular port 303 as controlled by the operation of plunger 291, the pressure in 275 is limited to thereby operate the valve spool 264 in such a manner as to prevent any further increase in the pump outlet pressure by reducing the pump output displacement to the required level.

In each of the previously described embodiments, the pump control valve was at all times connected to the feedback lines from the load cylinders so that an increase in the pressure in any of the feedback lines, such as an external force acting on one of the load cylinders and increasing the pressure therein, would cause the control valve to operate and vary the pump displacement even though there had been no actuation of any of the load control valves. In the system shown in FIGURE 5, the load control valve is arranged so that when it is in a neutral position, the feedback line is cut off from the load and connected to the load only prior to and during the actuation of the valve to connect the load cylinder to the pump. As shown in FIGURE 5, the system includes a pump 320 of the variable displacement type controlled by a control cylinder 321 in the same manner as in the previously described embodiments. The pump is connected to a reservoir 322 through an inlet 323 and has a high pressure outlet line 325 to supply fluid to a three way load control valve 327. The load control valve 327 is connected back to the reservoir 322 through a drain line 328 and connected through an outlet line 331 to a single acting load cylinder 333.

The load control valve 327 is constructed to that when the load cylinder 333 is connected to drain or is blocked off, the pressure therein will not be communicated to the pump control valve. Upon actuation of the load control valve 327 to connect the pump outlet to the load cylinder 333, the initial movement of the valve will supply feedback pressure from the load cylinder 333 to the pump control valve before the pump outlet is connected to the load cylinder. Accordingly, the load control valve 327 may be constructed as shown to include a valve spool or plunger 329 having a pair of lands 332 and 334 which are interspaced by a reduced diameter annular groove 335.

When the valve spool 327 is in the neutral position the groove 335 will be in alignment with the outlet line 331 while the one land 332 will block off the port 333a to which the drain line 328 is connected. Likewise, the other land 334 will block off the feedback line 337 leading to the pump control valve as well as the pump outlet line 325. Upon movement of the spool 329 in one direction, the land 332 is shifted toward the left to bring the groove 335 into communication with the port 333a so as to allow the fluid in the load cylinder 333 to flow through the outlet line 331 to reservoir through line 328. For actuating the load, the plunger 329 is moved in the other direction so that initial movement of the plunger brings the annular groove 335 into communication with the feedback line 337 so that the pressure in load cylinder 333 is communicated through outlet line 331 and groove 325 to the feedback line 337 while the land 334 still blocks off the pump outlet line 325. This arrangement now transmits the feedback pressure to the pump control valve to bring the pump outlet pressure up to the predetermined level above that in the load cylinder 333. Further movement of the plunger 329 then shifts the land 334 further so that it uncovers the pump outlet line 325 so that fluid from the pump may now flow into the groove 335 and hence through the outlet line 331 into the load cylinder 333.

As shown, the feedback line 337 has an orifice 338 therein for stability purposes to prevent excessive pressure surges in the feedback line. If desired, the load control valve plunger 329 may be arranged to reconnect the feedback line 337 to drain when it is in the neutral position.

The valve for controlling the fluid flow to and from the control cylinder 321 includes a housing 340 having a valve bore 341 at one end therein. A line 343 extends between the pump outlet line 325 and the end of valve bore 341 so that the end of the bore is always pressurized at full outlet pressure. A valve spool 344 is slidably mounted within valve bore 341 and has thereon a valving land 345 which cooperates with a control line 347 connected to the control cylinder 321 to selectively connect the control line 347 either to pump outlet pressure or to drain for varying the output displacement of the pump. At its other end, the valve spool 344 has a guide land 349 which extends into the chamber 351 and is cut away so as to allow free fluid communication between the bore 341 on the low pressure side of valving land 345 and the chamber 351. A spring abutment member 352 is mounted within the chamber 351 on the end of guide land 349 to engage a control spring 353. At its other end, the chamber 351 opens into an enlarged bore 355 at a shoulder 356, and a piston 357 is slidably mounted within the large bore 355 and abuts against the other end of the control spring 353. A passage 359 extends through the pistion 357 to allow free fluid communication therethrough to insure that the fluid pressure is always balanced on both sides of the piston 357. For stability purposes as set forth in the description of the system of FIGURE 1, an orifice passage 361 extends between the control line 347 and the large bore 355 is connected to the reservoir 322 through a drain line 363.

An end housing 365 is mounted on the end of housing 340 and is threadedly received within the outer end of bore 355 with which it makes sealing contact by an O-ring seal 366. The end housing 365 has a recess 368 adjacent the piston 357, and at the inner end of recess 368 is a reduced diameter axial bore 369 which at its opposite end opens into a larger bore 371. Bore 371 is closed at its outer end by a plug 372 carrying an O-ring seal 373 and retained in place by suitable means such as a retainer ring 374. A plunger 376 is slidably mounted within the reduced bore 369 to engage the pistion 357 at its left end, and the plunger 376 has an enlarged head 378 at its other end within the large bore 371 adjacent the plug 372. A balancing spring 381 is mounted around the plunger 376 within the bore 371 to abut at its one end against the plunger head 378 and at its other end against the inner end of bore 371. The feedback line 337 is connected to the large bore 371 so that this space is at all times at the same pressure level as that within the feedback line, and depending upon the operation of the load control valve, at the pressure within the load cylinder 333.

The control valve of FIGURE 5 is quite similar in operation to the valve of FIGURE 1, and when there is no pressure signal in the feedback line 337, the bore 371 will be at a low pressure substantially equal to that of the reservoir since the feedback line 337, not being connected to the load, will drop to drain or reservoir pressure. In this case, the control spring 353 will apply relatively low biasing force to the valve spool 334 so that the valve spool will admit pump outlet pressure to the line 343 to the control cylinder line 347 at relatively low pressure and the pump outlet volume will be regulated at a relatively low level to maintain a low pump outlet pressure. However, upon actuation of the load control valve 327 to allow communication between the load cylinder 333 and the feedback line 337, the pressure within the load cylinder will be communicated to the feedback line to the large bore 371 where it will exert a force on the plunger 376 shifting the piston 357 to the left to increase the biasing force of the control spring 353. This causes the valve spool 344 to operate to increase the pump outlet pressure to a level above that in the load cylinder 333 and any changes in the pressure in the load cylinder will cause the output displacement of the pump to shift to maintain a sufficiently higher pressure level to operate the load.

If the pressure in the feedback line 337 equals or exceeds the maximum pressure level for the pump, the plunger 376 will shift the piston 357 until it abuts against the shoulder 356 preventing further movement of the piston. Thus, any increase in the pump outlet pressure above this level will cause the valve spool 344 to operate as a pressure compensated valve of the sequence type to regulate the pump output displacement to prevent any further increase in pressure. It will be understood that in this case the balance spring 381 operates to provide relatively constant pressure drop across the load control valve 327 in the same manner as in the embodiment set forth in FIGURE 1.

While several embodiments of this invention have been shown and described in detail, it is recognized that upon understanding this invention various further modifications and rearrangements will readily suggest themselves to those skilled in the art and may be resorted to without departing from the scope of the invention as defined in the claims.

I claim:

1. A fluid pressure system comprising a variable displacement pump having a control member movable to shift the pump output displacement, a fluid pressure means operable to shift said control member to a reduced displacement position, said pump having an outlet, a fluid load connected to said pump outlet, a pump control valve having a valve member therein, means operable by pump outlet pressure to shift said valve member in a direction to operably interconnect said pump outlet and said control motor to reduce the output displacement of the pump, first means operable to bias said valve member in the opposite direction, and second means responsive to the fluid pressure at said load operable to apply a biasing force on said valve member to increase the pressure level at said pump outlet necessary to shift said valve member to reduce the output displacement of the pump, and means operable responsive to said fluid pressure at said load to limit said second biasing force on said valve member to thereby limit the maximum outlet pressure of the pump.

2. A fluid pressure system comprising a variable displacement pump having a control member movable to shift the pump output displacement, means normally biasing said pump to the maximum displacement position, a fluid pressure operated control motor operable to shift said control member to a reduced displacement position responsive to increased pressure in said control motor, said pump having an outlet, a hydraulic device connected to said pump outlet, a pump control valve having a valve member therein, means operable by pump outlet pressure to shift said valve member in a direction to operably interconnect said pump outlet and said control motor to reduce the output displacement of the pump, first means operable to bias said valve member in the opposite direction, and second means responsive to the fluid pressure at said hydraulic device operable to apply a biasing force on said valve member to increase the pressure level at said pump outlet necessary to shift said valve member to reduce the output displacement of the pump, and means operable responsive to said fluid pressure at said load to limit said second biasing force on said valve member to thereby limit the maximum outlet pressure of the pump.

3. A fluid pressure system comprising a variable displacement pump having a control member movable to shift the pump output displacement, means normally biasing said pump to the maximum displacement position, a fluid pressure operated control motor operable to shift said control member to a reduced displacement position responsive to increased pressure in said control motor, said pump having an outlet, a fluid load motor, a load control valve interconnecting said pump outlet and said load motor, a pump control valve having a valve member therein, means operable by pump outlet pressure to shift said valve member in a direction to operably interconnect said pump outlet and said control motor to reduce the output displacement of the pump, control spring means operable to bias said valve member in the opposite direction, fluid pressure means responsive to the fluid pressure in said load motor operable to increase the spring biasing force on said valve member to increase the pressure level at said pump outlet necessary to shift said valve member to reduce the output displacement of the pump, and stop means to limit said increase of said spring biasing force on said valve member to thereby limit the maximum outlet pressure of the pump.

4. A fluid pressure system comprising a variable displacement pump having a control member movable to shift the pump output displacement, means normally biasing said pump to the maximum displacement position, a fluid pressure operated control motor operable to shift said control member to a reduced displacement position responsive to increased pressure in said control motor, said pump having an outlet, a fluid load motor, a load control valve interconnecting said pump outlet and said load motor, a pump control valve having a valve member therein, means operable by pump outlet pressure to shift said valve member in a direction to operably interconnect said pump outlet and said control motor to reduce the output displacement of the pump, control spring means operable to bias said valve member in the opposite direction, and fluid pressure means responsive to the fluid pressure in said load motor operable to vary the biasing force of said control spring acting on said valve member to increase the pressure level at said pump outlet necessary to shift said valve member to reduce the output displacement of the pump.

5. A fluid pressure system as set forth in claim 4 wherein said fluid pressure means comprises slidable piston means engageable with said control spring and stop means to limit the increase in biasing force of said control spring and thereby limit the maximum outlet pressure of the pump.

6. A fluid pressure system comprising a variable displacement pump having a control member movable to shift the pump output displacement, means biasing said pump to the maximum displacement position, a fluid pressure operated control motor operable to shift said control member to a reduced displacement position responsive to increased pressure in said control motor, said pump having an outlet, a fluid load motor, a load control valve interconnecting said pump outlet and said load motor, a pump control valve having a valve member therein, means operable by pump outlet pressure to shift said valve member in a direction to operably interconnect said pump outlet and said control motor to reduce the output displacement of the pump, a control spring having one end operably engaging said valve member to bias said valve member in the opposite direction, piston means engaging the other end of said control spring and fluid pressure means responsive to the fluid pressure in said load motor to shift said piston means with respect to said valve member to vary the biasing force of said control spring acting on said valve member to increase the pressure level at said pump outlet necessary to shift said valve member to reduce the output displacement of the pump and stop means engageable by said piston means to limit the maximum biasing force of said control spring to limit the maximum outlet pressure of the pump.

7. A fluid pressure system as set forth in claim 6, including balance spring means engageable with said piston means to oppose said fluid pressure means and constructed and arranged to compensate for variations in pump outlet pressure to maintain the pressure drop across said load control valve constant independent of the pump outlet pressure below said maximum pump outlet pressure.

8. A fluid pressure system as set forth in claim 6 wherein said fluid pressure means included a feedback line interconnecting said fluid pressure means and said fluid load motor, a check valve in said feedback line operable to permit fluid flow only from said load motor to said fluid pressure means, and bleed means operable to provide restricted bleed from said fluid pressure means.

9. A fluid pressure system as set forth in claim 6 wherein said fluid pressure means includes a sealed expansible chamber and a line interconnecting said sealed chamber and said fluid load motor.

10. A fluid pressure system comprising a variable displacement pump having a control member movable to vary the pump output displacement, means biasing said pump to the maximum displacement position, a fluid pressure operated control motor operable to reduce the output displacement of the pump, a reservoir, said pump having an inlet connected to said reservoir and an outlet, a fluid load motor, a load control valve interconnecting said pump outlet and said load motor, a pump control valve having a housing, a bore in said housing, a valve member slidably movable in said bore, means connecting one end of said bore to said pump outlet whereby said pump outlet pressure is operable to shift said valve member in one direction, valving and porting means on said valve member and said bore conected to said control motor and said reservoir whereby movement of said valve member in said one direction allows pump outlet pressure to flow to said control motor to reduce the displacement of the pump and movement of said valve member in the other direction connects said control motor to said reservoir to allow said biasing means to increase the output displacement of said pump, a control spring in said housing engageable at one end with said valve member to shift said valve member in said other direction, a spring abutment member movably mounted in said housing and engageable with the other end of said control spring whereby movement of said spring abutment member in said other direction increases the biasing force of said control spring on said valve member to increase the outlet pressure of said pump, a feedback line interconnecting said load motor with said housing, means operable by fluid pressure in said feedback line to shift said spring abutment member in said other direction, and stop means operable to limit the increased biasing force applied by said control spring to said valve member to thereby define a maximum outlet pressure for said pump.

11. A fluid pressure system as set forth in claim 10 wherein said fluid means operable by fluid pressure includes a feedback chamber connected to said feedback line, a piston slidably carried in said feedback chamber and having an effective area exposed to the pressure in said feedback chamber greater than the effective area of said valve member exposed to pump outlet pressure.

12. A fluid pressure system as set forth in claim 11 including a balance spring engageable at one end with said housing and at the other end with said piston and operable to bias said piston in said one direction whereby the biasing force of said balance spring compensates for the pressure in said feedback line acting on the differential area by which the effective area of said piston exceeds said effective area of said valve member to maintain said pump outlet pressure at a constant difference above the pressure in said feedback line independently of the outlet pressure below said maximum pump outlet pressure.

13. A fluid pressure system as set forth in claim 11 including check valve means in said feedback line to prevent fluid flow from said feedback chamber to said load motor, and a restricted bleed from said feedback line to said reservoir.

14. A fluid pressure system as set forth in claim 11 wherein said feedback chamber and said feedback line are sealed to prevent leakage therefrom and said feedback chamber is in communication with said load motor at all times.

15. A fluid pressure system as set forth in claim 14 including a second load motor, a second feedback line interconnecting said second load motor and said housing, said feedback chamber being a bore with said piston slidable therein, a second piston slidable in said bore and making sealing contact therewith to separate said bore into said first and second chambers, said first feedback line being connected to said first chamber and said second feedback line being connected to said second chamber, and said first and second pistons being constructed to abut each other if the pressure in said second feedback line exceeds the pressure in said first feedback line whereby said spring abutment member is shifted in response to the highest pressure in either feedback line.

16. A fluid pressure system comprising a variable displacement pump having a control member movable to vary the pump output displacement, means biasing said pump to the maximum displacement position, a fluid pressure operated control motor operable to reduce the output displacement of the pump, a reservoir, said pump having an inlet connected to said reservoir and an outlet, a fluid load motor, a load control valve interconnecting said pump outlet and said load motor, a pump control valve having a housing, a bore in said housing, a valve member slidably movable in said bore, means connecting one end of said bore to said pump outlet whereby said pump outlet pressure is operable to shift said valve member in one direction, valving and porting means on said valve member and said bore connected to said control motor and said reservoir whereby movement of said valve member is said one direction allows pump outlet pressure to flow to said control motor to reduce the displacement of the pump and movement of said valve member in the other direction connects said control motor to said reservoir through said bore to allow said biasing means to increase the output displacement of said pump, a control chamber in said housing, a control spring in said control chamber operably engageable at one end with said valve member to shift said valve member in said other direction, a feedback line interconnecting said load motor with said control chamber to allow pressure in said feedback line to bias said valve member in said other direction to maintain pump outlet pressure above the pressure in said feedback line, and valve means between said feedback line and said control chamber operable to limit the pressure in said control chamber to thereby define a maximum outlet pressure for said pump.

17. A fluid pressure system as set forth in claim 16 wherein said last mentioned valve means comprises a plunger slidably carried in said housing, said plunger being operably engaged with the other end of said control spring to bias said plunger in said one direction, said plunger having an area exposed to fluid pressure in said feedback line for biasing said plunger in said other direction, said plunger having cooperating porting means for allowing fluid flow from said feedback line to said control chamber when shifted in said one direction and for reducing flow to said control chamber from said feedback line when shifted in said other direction to limit the maximum pressure in said control chamber.

18. A fluid pressure system as set forth in claim 17 including a restricted bleed from said control chamber to said reservoir and means operable to substantially block off said bleed passage when said pump outlet pressure is less than said maximum outlet pressure.

19. A fluid pressure system comprising a variable displacement pump having a control member movable to vary the pump output displacement, means biasing said pump to the maximum displacement position, a fluid pressure operated control motor operable to reduce the output displacement of the pump, a reservoir, said pump having an inlet connected to said reservoir and an outlet, a fluid load motor, a load control valve interconnecting said pump outlet and said load motor, a pump control valve having a housing, a bore in said housing, a valve member slidably movable in said bore, means connecting one end of said bore to said pump outlet whereby said pump outlet pressure is operable to shift said valve member in one direction, valving and porting means on said valve member and said bore connected to said control motor and said reservoir whereby movement of said valve member in said one direction allows pump outlet pressure to flow to said control motor to reduce the displacement of the pump and movement of said valve member in the other direction connects said control motor to said reservoir to allow said biasing means to increase the output displacement of said pump, a control chamber in said housing, a control spring in said control chamber operably engageable at one end with said valve member to shift said valve member in said other direction, a feedback line interconnecting said load motor with said housing, and valve means operable by pressure in said feedback line to control fluid pressure in said control chamber biasing said valve member in said other direction to maintain pump oultlet pressure above the pressure in said feedback line, and means to limit the pressure in said control chamber to thereby define a maximum outlet pressure for said pump.

20. A fluid pressure system as set forth in claim 19 wherein said last mentioned means is a relief valve connecting said control chamber to said reservoir.

21. A fluid pressure system comprising a variable displacement pump having a control member movable to vary the pump output displacement, means biasing said pump to the maximum displacement position, a fluid pressure operated control motor operable to reduce the output displacement of the pump, a reservoir, said pump having an inlet connected to said reservoir and an outlet, a fluid load motor, a load control valve interconnecting said pump outlet and said load motor, a pump control valve having a housing, a first bore in said housing, a valve member slidably movable in said first bore connecting one end of said first bore to said pump outlet whereby said pump outlet pressure is operable to shift said valve member in one direction, valving and porting means on said valve member and said first bore connected to said control motor and said reservoir whereby movement of said valve member in said one direction allows pump outlet pressure to flow to said control motor to reduce the displacement of the pump and movement of said valve member in the other direction connects said control motor to said reservoir to allow said biasing means to increase the output displacement of said pump, a first control chamber in said housing adjacent said first bore, a first control spring in said control chamber operably engageable at one end with said valve member to shift said valve member in said other direction, a second bore in said housing, a valve plunger slidably movable in said second bore, a supply line from said pump outlet opening into the said second bore adjacent said valve plunger, a drain line from said second bore to said reservoir, cooperating valving and porting means on said valve plunger and said second bore and connected to said first control chamber operable to connect said first control chamber with said supply line upon movement of said valve plunger in a first direction and to connect said first control chamber with said reservoir upon movement of said valve plunger in the opposite direction, a second control chamber adjacent one end of said second bore and connected to said first control chamber, a second control spring in said second chamber operable to bias said valve plunger in said first direction, a feedback chamber at the other end of said second bore, a feedback line interconnecting said load motor and said feedback chamber whereby said feedback chamber is pressurized at the same level as said load motor, and means responsive to the pressure in said feedback chamber to bias said plunger in said opposite direction whereby said valve plunger regulates the pressure in said first control chamber at a pressure level to maintain said pump outlet pressure a difference above the pressure in said feedback line, and means to limit the pressure in said first and second control chambers to thereby define a maximum outlet pressure in said pump.

22. A fluid pressure system as set forth in claim 21 wherein said last mentioned means is a relief valve interconnecting said first control chamber and said reservoir.

23. A fluid pressure system as set forth in claim 21 including a plurality of load motors, a like plurality of piston means in said feedback chamber, a feedback line from each load motor, said feedback lines interspacing said piston means, said piston means being operable to shift said valve plunger in said opposite direction whereby said pump is regulated to supply a pump outlet pressure a difference above the highest pressure in any one of said feedback lines.

24. A fluid pressure system comprising a reservoir, a variable displacement pump having a control member movable to vary the pump output displacement, a fluid pressure operated control motor operable to shift said control member, said pump having an inlet connected to said reservoir and an outlet, a fluid load motor, a feedback line carrying pressure responsive to the pressure in said load motor, a control valve connected to said control motor and said pump outlet and said reservoir and said feedback line to control the fluid flow to and from said control motor to vary the pump displacement to maintain the pressure at said pump outlet a difference above the pressure in said feedback line, and control valve means adapted to control fluid flow between said load motor and said pump outlet and said reservoir and said feedback line, said control valve being operable in a neutral position to block off said pump outlet and said feedback line from said load motor, said control valve being operable to another position which first connects said load motor to said feedback line before said pump outlet is connected to said load motor to allow said control valve to operate said control motor to increase the pump output volume and pressure to a level above that in said load motor before said pump outlet is connected to said load motor.

25. A fluid pressure system comprising a reservoir, a variable displacement pump having a control member movable to vary the pump output displacement, a fluid pressure operated control motor operable to shift said control member, said pump having an inlet connected to said reservoir and an outlet, a fluid load motor, a feedback line carrying pressure responsive to the pressure in said load motor, a pump control valve connected to said control motor and operable responsive to pressure in said feedback line to control the fluid flow to and from said control motor to vary the pump displacement to maintain the pressure at said pump outlet a difference above the pressure in said feedback line, and selector control valve means adapted to control fluid flow between said load motor and said pump outlet and said reservoir and said feedback line, said selector control valve being operable in a neutral position to block off said pump outlet and said feedback line from said load motor, said selector control valve being operable to another position to sequentially connect said load motor first to said feedback line and then to said pump outlet to allow said pump control valve to operate said control motor to increase the pump output volume and pressure to a level above that in said load motor before said pump outlet is connected to said load motor.

26. A fluid pressure system comprising a reservoir, a variable displacement pump having a control member movable to vary the pump outlet displacement, a fluid pressure operated control motor operable to shift said control member, said pump having an inlet connected to said reservoir and an outlet, a fluid load motor, a feedback line carrying pressure responsivle to the pressure in said load motor, a pump control valve connected to said control motor and operable responsive to pressure in said feedback line to control the fluid flow to and from said control motor to vary the pump displacement to maintain the pressure at said pump outlet a difference above the pressure in said feedback line, and selector control valve means adapted to control fluid flow between said load motor and said pump outlet and said reservoir and said feedback line, said selector control valve including port means and a movable valve member operable in a neutral position to block off said pump outlet and said feedback line from said load motor, said valve member being first movable to another position to sequentially connect said load motor first to said feedback line and then to said pump outlet to allow said pump control valve to operate said control motor to increase the pump output volume and pressure to a level above that in said load motor before said pump outlet is connected to said load motor.

27. A fluid pressure system as set forth in claim 26 wherein said movable valve member is an axially movable spool and said port means includes in sequence a first port connected to said load motor, a second port connected to said feedback line and a third port connected to said pump outlet.

References Cited

UNITED STATES PATENTS

| | | |
|---|---|---|
| 2,009,608 | 7/1935 | Douglas. |
| 2,238,061 | 4/1941 | Kendrick. |
| 2,238,063 | 4/1941 | Kendrick. |
| 2,892,312 | 6/1959 | Allen et al. |
| 2,915,985 | 12/1959 | Budzich _____ 103—162 |
| 3,208,396 | 9/1965 | Budzich et al. _____ 103—162 |
| 3,272,135 | 9/1966 | Bloomquist _____ 103—38 |

EDGAR W. GEOGHEGAN, *Primary Examiner.*

U.S. Cl. X.R.

103—38